(12) United States Patent
Pham et al.

(10) Patent No.: US 7,808,902 B1
(45) Date of Patent: Oct. 5, 2010

(54) METHOD OF PERFORMANCE MEASUREMENT FOR A SCALABLE NETWORK

(75) Inventors: Donald Pham, San Jose, CA (US); Duc Pham, San Jose, CA (US); Chinh Phan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1441 days.

(21) Appl. No.: 09/922,520

(22) Filed: Aug. 3, 2001

(51) Int. Cl.
  *H04L 12/26* (2006.01)
(52) U.S. Cl. .................. 370/231; 370/235; 709/231; 709/232
(58) Field of Classification Search ......... 370/252–254, 370/401, 241, 242, 250, 244, 245, 230, 230.1, 370/231–235; 709/223–225, 229, 231–233, 709/235, 241, 239; 714/706, 712, 715
See application file for complete search history.

(56) References Cited

U.S. PATENT DOCUMENTS

| | | | | |
|---|---|---|---|---|
| 5,477,531 A * | 12/1995 | McKee et al. | ................ | 370/249 |
| 5,627,970 A * | 5/1997 | Keshav | ....................... | 709/233 |
| 6,034,948 A * | 3/2000 | Nakamura et al. | .......... | 370/246 |
| 6,201,791 B1 * | 3/2001 | Bournas | ...................... | 370/234 |
| 6,243,832 B1 * | 6/2001 | Eckes et al. | .................... | 714/33 |
| 6,363,056 B1 * | 3/2002 | Beigi et al. | ................. | 370/252 |
| 6,625,764 B1 * | 9/2003 | Dawson | ..................... | 714/715 |
| 6,633,544 B1 * | 10/2003 | Rexford et al. | .............. | 370/238 |
| 6,662,009 B2 * | 12/2003 | Lynn | .......................... | 455/424 |
| 6,690,645 B1 * | 2/2004 | Aweya et al. | ............... | 370/230 |
| 6,701,375 B1 * | 3/2004 | Walker et al. | ............... | 709/243 |
| 6,732,182 B1 * | 5/2004 | Beverly, IV | ................. | 709/230 |
| 6,816,464 B1 * | 11/2004 | Scott et al. | ................... | 370/252 |
| 6,901,051 B1 * | 5/2005 | Hou et al. | .................... | 370/231 |
| 6,925,431 B1 * | 8/2005 | Papaefstathiou | ............. | 703/17 |
| 7,010,295 B1 * | 3/2006 | Zerlan et al. | ................. | 455/424 |
| 7,222,255 B1 * | 5/2007 | Claessens et al. | .............. | 714/4 |
| 7,272,643 B1 * | 9/2007 | Sarkar et al. | ................. | 709/222 |
| 2002/0071391 A1 * | 6/2002 | Ishioka | ........................ | 370/238 |

* cited by examiner

*Primary Examiner*—Pankaj Kumar
*Assistant Examiner*—Duc T Duong
(74) *Attorney, Agent, or Firm*—Patterson & Sheridan, L.L.P.

(57) ABSTRACT

Systems and methods for measuring the performance of a scalable network are disclosed. In one embodiment, a system configured in accordance with this disclosure may comprise a packet generator for providing test packets to a network under test; and a packet count unit for counting test packet received from the network under test. The system may be configured to test networks of various bandwidths such as OC-3 and OC-12 level networks.

12 Claims, 7 Drawing Sheets

METHOD OF PERFORMANCE MEASUREMENT FOR A SCALABLE NETWORK

BACKGROUND

Field of the Disclosure

The disclosure relates generally to data communications, and in particular, to measuring the performance of scalable network architectures.

PRIOR ART

Background

Determining the performance level of high speed networks can be a challenging task. For example, measuring the performance data of up to 8000 (or N) individual subscribers each with separate data streams can be a complex undertaking.

FIG. 1 shows an example of a prior art communication system. FIG. 1 shows a sender and a receiver connected to a network cloud. For purposes of this disclosure, the sender and receiver may be any standard electronic devices which desire to communicate through an electronic network such as the Internet, a Local Area Network (LAN), or a Wide Area Network (WAN).

To the end user, the operation of the system in FIG. 1 should be transparent and error free. For example, an end user (receiver) watching streaming video originating from a video server (sender) should never know what is taking place within the network cloud that makes the process possible.

FIG. 2 is a more detailed diagram of a prior art communications system. FIG. 2 expands on the detail of FIG. 1 by showing an example of communications occurring over a standard Internet connection. FIG. 2 includes a host and a server connected to a network cloud comprising a plurality of routers. In FIG. 2, the host wishes to transmit a packet P to the server. As is known by those of ordinary skill in the art, when the packet P arrives at router 1, the router 1 will encode the packet P with a unique identifier containing the source and destination addresses. Then router 1 will forward the packet P onto the destination through other routers according to standard routing protocols. In this example, router 1 will forward packet P onto router 4, which will then forward the packet P onto the ultimate destination, which in our example here is the server.

One application of the Internet that is seeing wider use in small and medium-sized businesses is Internet-based telephony. As the backbone of the Internet continues to be upgraded and expanded, the promise of a low-cost substitute to the traditional PBX system may now be realized.

FIG. 3 is a conceptual block diagram of a typical prior art router. A typical prior art router may have a plurality of input ports and a plurality of output ports connected through a switching fabric which forms the heart of the router. Routers will typically contain a routing processor containing standard hardware and software, and may also contain a firewall application standard in the art as shown in FIG. 3.

In operation, when a packet appears at an input port such as input port 1 in FIG. 3, the firewall application will first examine the packet to see if the packet is safe to route through. If the packet is safe, then the routing processor will route the packet through the switching fabric to the appropriate output port, such as output port 1 as shown in FIG. 3.

As is known by those of ordinary skill in the art, the switching fabric contained within a high-end router comprises fast but expensive semiconductor switches which places such a router out of reach for smaller enterprises.

In order to satisfy smaller enterprises serving 20-50 people, lower cost routers have been developed which utilize software-based switches instead of a switching fabric.

FIG. 4 shows a conceptual diagram of a prior art software-based router. The router of FIG. 4 includes a central processor, such as a Motorola 860 Power PC. The router may be coupled to a LAN, such as an Ethernet-based network, and a WAN, such as a T1 line. The router may also be coupled to a network through either the LAN or WAN.

Thus, routers form the heart of any network-based communication system. Hence, it is important to be able to determine the performance level of a router-based system.

To determine the performance level of network-based system, typically network sessions are set up and packets are sent through the system to a Count Unit, where the contents of the packets are examined to detect errors.

However, at a high number of session count, it can be a very tedious and time-consuming chore to examine packets at the Count Unit. The ability to detect load balancing between these N number of traffic streams is also essential in guaranteeing fairness distribution of traffic load per each subscriber. This requires a complex piece of test equipment at a very high cost in order to perform this operation.

Given the nature of the emerging broadband technologies, as new network architectures become available it is desired that performance testing should be executed in a consistent and precise manner. Consequently, there is a need for a test infrastructure which is flexible and modular such that new features and/or platforms can be added seamlessly without requiring major changes. Such a system would allow engineering personnel to gain sufficient data to analyze the differences between network architectures, and to fully understand their strengths and weaknesses from the performance perspective, especially very early in the engineering development cycle.

SUMMARY

Systems and methods for measuring the performance of a scalable network are disclosed. In one embodiment, a system configured in accordance with this disclosure may comprise a packet generator for providing test packets to a network under test; and a packet count unit for counting test packet received from the network under test. The system may be configured to test networks of various bandwidths such as OC-3 and OC-12 level networks.

One aspect of a method for measuring the performance of a scalable network includes preparing a network under test for testing; sending, by a packet generator, a constant stream of packets through a network under test; and counting, by a packet count unit, received packets.

In various aspects of a disclosed system, corresponding routing paths for a sessions to be tested, and a static IP routes for each the session may also be established. Test packets may be provided in a constant stream to the network under test. The peak performance rate of the network under test is established as the highest rate with no packet dropout, or as the maximum receive rate at a particular packet size with no packet dropout.

BRIEF DESCRIPTION OF THE DRAWING FIGURES

DETAILED DESCRIPTION

Figure 1:
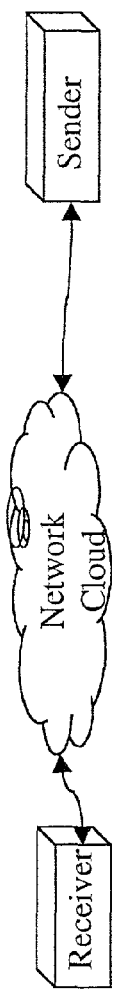
FIG. 1 is a prior art diagram of a communications system.
Figure 2:
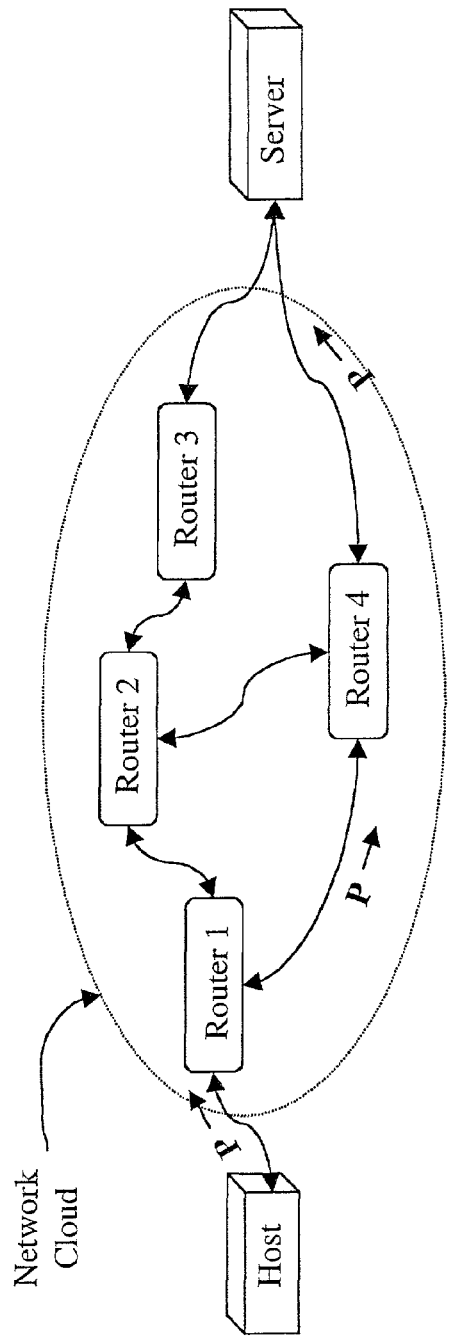
FIG. 2 is a prior art diagram of a communications system.
Figure 3:
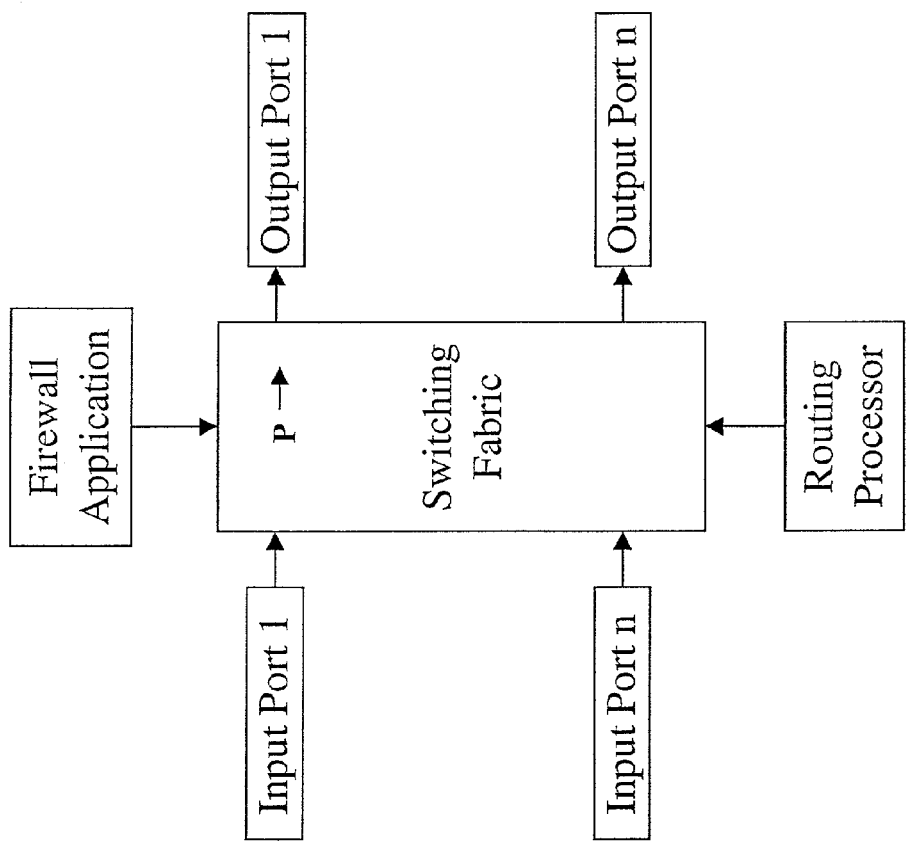
FIG. 3 is a prior art diagram of a router.
Figure 4:
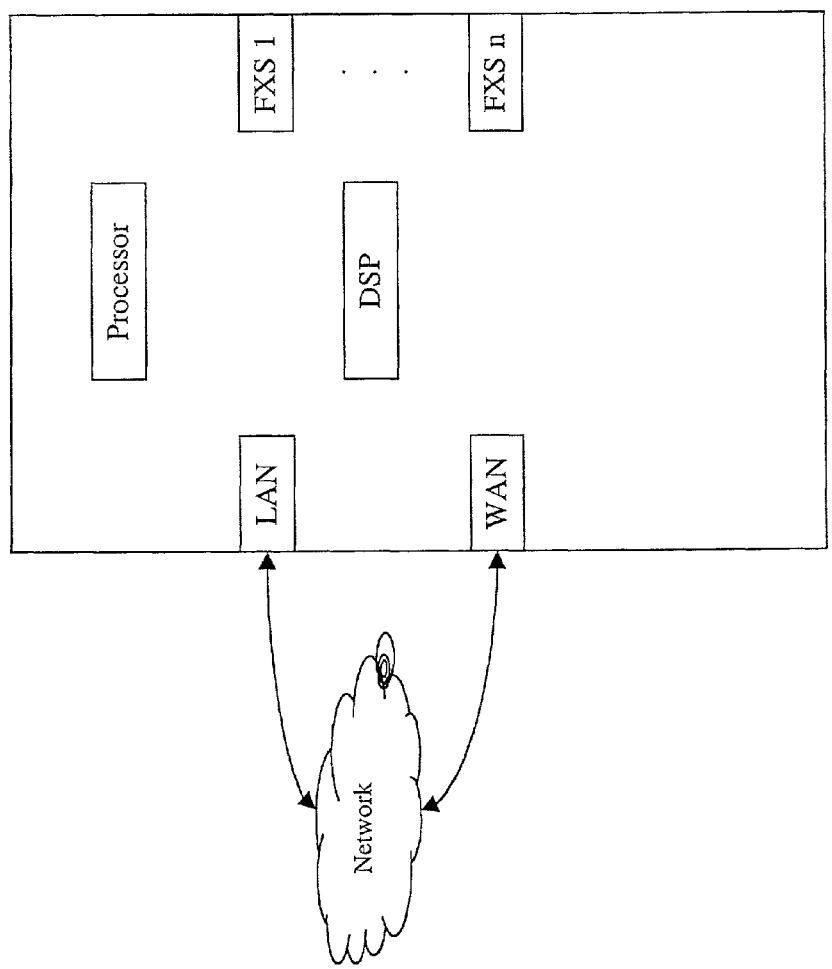
FIG. 4 is a functional diagram of a prior art router.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Overview

Figure 5:
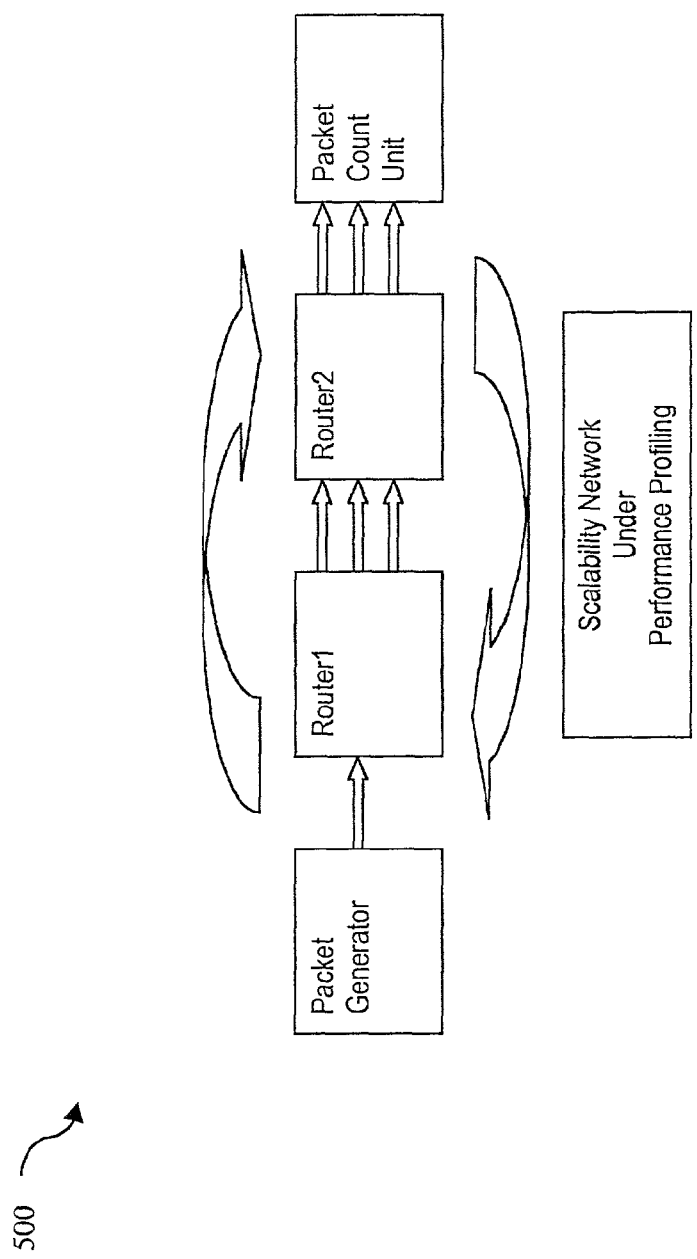
FIG. 5 is a block diagram of a system for measuring the performance of a scalable network.

FIG. 5 shows a block diagram of a network system 500 for which the performance level is desired to be determined in accordance with the teachings of this disclosure. The system 500 may include a packet generator for providing test packets to a scalability network under test. In the system 500 of FIG. 5, the system formed by Router 1 and Router 2 is to be examined. Other exemplary topologies will be disclosed below.

It is contemplated that a wide variety of standard routing equipment may be used for the test process of the present disclosure. For example, any conventional router which is capable of displaying the input and output packet numbers may be used. Additionally, any packet generator which is capable of sending packets to multiple destination may be employed, such as a Pagent packet generator available from Cisco Systems, Inc. This may also be achieved by any available in-house router-based packet generator.

Tool Command Language (TCL) scripts may be developed to control the router, enabling it to act as a traffic generator. The tool preferably has the capability of sending packets to multiple destinations from a single source to simulate many traffic streams to a large number of subscribers. Since the disclosed test procedure is router-based, any mid-range router may be converted for this usage by loading a special Pagent software image configured in accordance with this disclosure. Many suitable mid-range routers are available from Cisco Systems, Inc., and other manufacturers as well. Thus, the disclosed test presents a very cost-effective solution.

The system 500 may also include a packet count unit for counting the packets transported by the network under test. TCL scripts may also be developed to control this Pagent router, enabling it to count incoming packets and to keep track of statistics.

Figure 6:
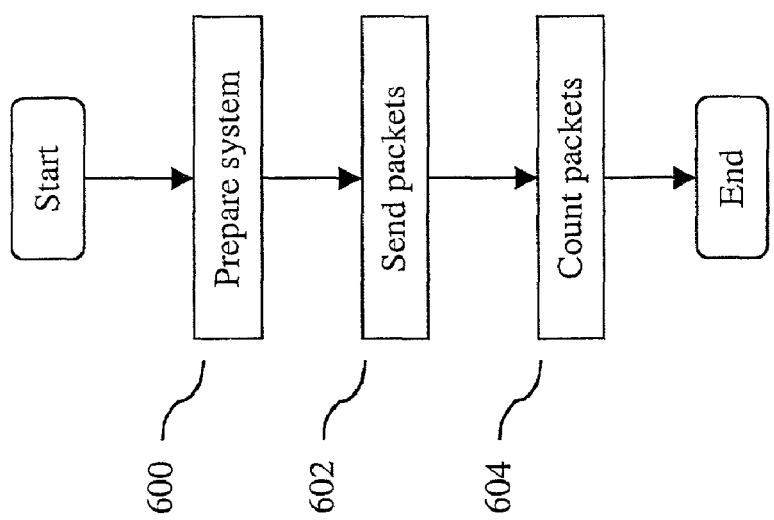
FIG. 6 is a flow diagram of a method for measuring the performance of a scalable network.
Figure 7:
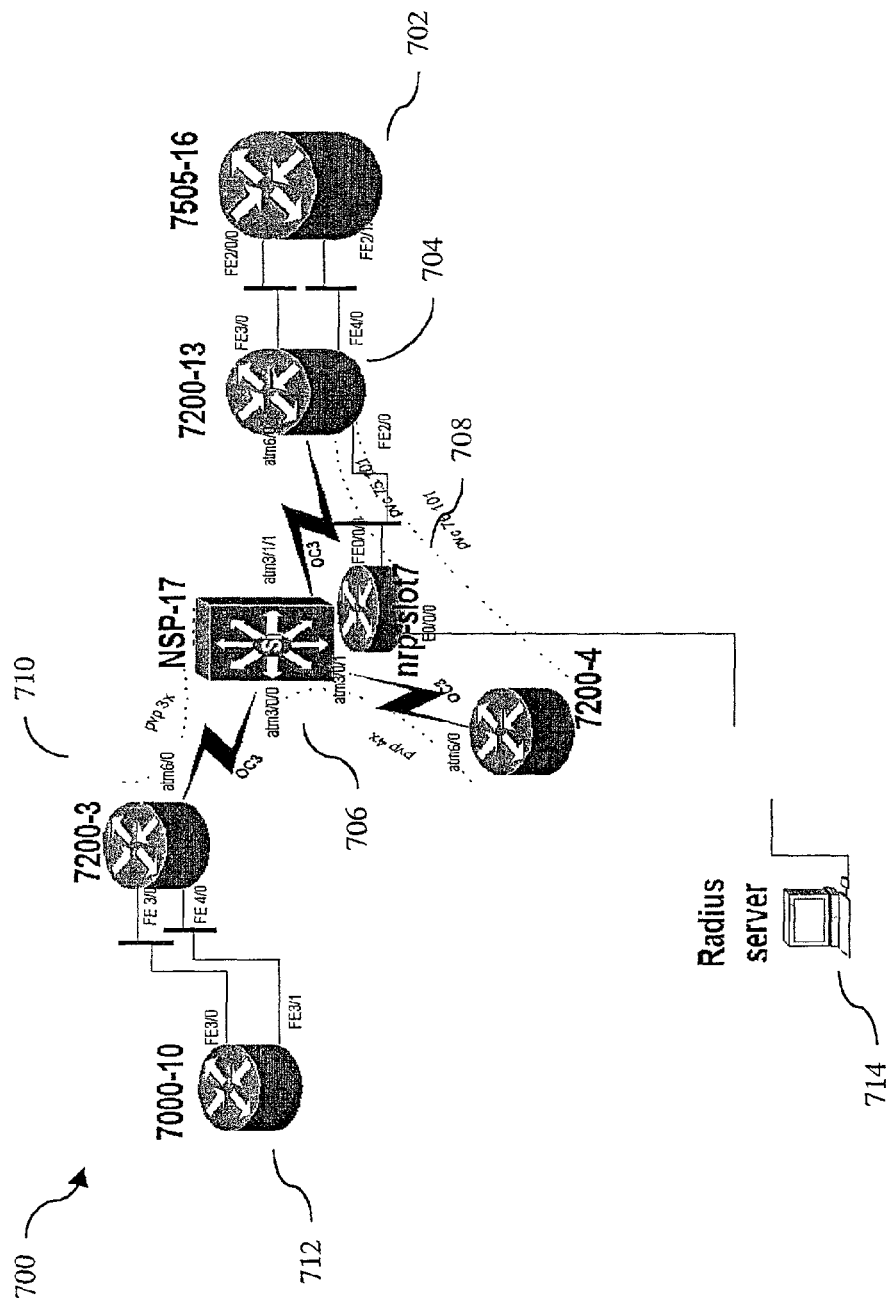
FIG. 7 is an example of a system for measuring the performance of a scalable network.

The performance of the system 500 of FIG. 5 may be examined through the process of FIG. 6.

The process of FIG. 6 may begin in act 600 where the system may be prepared for examination.

In a preferred embodiment, the Device-Under-Test may be pre-configured with N-number of sessions. Additionally, the routing path for each session may also be up and working. An IP static route may be used for each session/stream to route packets of individual session from Router 1 to Count-Unit.

The test process may then be initiated in act 602 by sending a constant number of packets (called Sent-Packets) from the Packet-Generator. In the test of this disclosure, the expectation is that the same number of packets will be received at the Count-Unit.

In the tests of the prior art, the contents of each packet are inspected to determine the performance level of the system. In the test of this disclosure, a statistical method may be used to alleviate the need of manual inspection of every single packet to determine accurate performance data. In the test process of this disclosure, the total packets received at the Count-Unit is counted and tabulated in act 604. Furthermore, the packets may be counted at some other desired destination.

The packet count may then be examined to determine the performance level of the system under test. Initially, both the count numbers of the Sent-Packets and the Received-Packets should be equal at first. The packet rate may then be gradually increased. At some higher rate, the Received-Packets will begin lag behind at some higher rate. The rate which the Received-Packets begin to lag is the measured performance number. The peak rate may be defined as the highest rate with no packet dropouts.

It is contemplated that the packet rate may be cycled through a predetermined test pattern. A wide variety of pre-determined or standard sets of performance parameters may be defined to provide a consistent set of data for ease of analysis and comparison. For example, packet sizes of 64, 256, 512, 1514, IMIX; session counts of 1, 1000, 2000, 4000, and 8000; as well as all supported media switching paths. Test parameters may be defined in a separate CONFIG file for ease of maintenance and management.

Additionally, router configuration files may be placed on a TFTP server for downloading. This provides ease of maintenance, management, and configuring of each router profiles and configurations. TCL scripts developed for the performance tests may be platform independent thus provide ease of portability to add new network architectures and/or platforms.

An exemplary test performed in accordance with the teachings of this disclosure will now be disclosed. In the following example, a topology as disclosed in FIG. 5 was used. The system was configured for 2000 sessions, and an IP static route was set for each session to route the packets of the individual sessions from Router 1 to the Packet Count Unit.

The results are tabulated in Table 1:

TABLE 1

NUMBER OF SESSIONS: 2000
Packet size 64

| sendRate (pps) | Routr1_in (pkts) | Routr1_out (pkts) | Routr2_in (pkts) | Routr2_out (pkts) | Count_in (pkts) | receiveRate (pps) |
|---|---|---|---|---|---|---|
| 10000 | 200000 | 200000 | 200000 | 200000 | 200000 | 10000 |
| 11000 | 200000 | 200000 | 200000 | 200000 | 200000 | 11000 |
| 12000 | 200000 | 200000 | 200000 | 200000 | 200000 | 12000 |
| 13000 | 200000 | 200000 | 200000 | 200000 | 200000 | 13000 |
| 14000 | 200000 | 200000 | 200000 | 200000 | 200000 | 14000 |
| 15000 | 200000 | 200000 | 198784 | 198784 | 198784 | 14909 |
| 20000 | 200000 | 200000 | 150076 | 150076 | 150076 | 15008 |
| 25000 | 200000 | 200000 | 120886 | 120886 | 120886 | 15111 |
| 30000 | 200000 | 200000 | 100551 | 100551 | 100551 | 15084 |
| 35000 | 200000 | 200000 | 86448 | 86448 | 86448 | 15129 |
| 40000 | 200000 | 200000 | 77301 | 77301 | 77301 | 15460 |
| 42000 | 200000 | 200000 | 73332 | 73332 | 73332 | 15399 |
| 45000 | 200000 | 200000 | 67529 | 67529 | 67529 | 15196 |
| 50000 | 200000 | 200000 | 60289 | 60289 | 60289 | 15072 |
| 55000 | 200000 | 200000 | 55316 | 55316 | 55316 | 15213 |
| 60000 | 200000 | 200000 | 50313 | 50313 | 50313 | 15095 |
| 65000 | 200000 | 186537 | 46657 | 46657 | 46657 | 15163 |
| 70000 | 200000 | 122801 | 44288 | 44288 | 44288 | 15502 |
| 75000 | 200000 | 112562 | 41419 | 41419 | 41419 | 15530 |
| 80000 | 200000 | 104585 | 39123 | 39123 | 39123 | 15649 |

Abbreviations in Table 1
pps: packet per second;
pkts: packets

It is contemplated that test reports may include of a set of comprehensive information regarding the packet throughput at each interface of the data path. This allows ease of debugging should there be any problems.

As can be seen from Table 1, the count in begins to deviate from the send rate at approximately 15,000 pps. The non-drop rate (packet per second or bits per second) may be determined as the maximum of the all receiving rates at a particular packet size. The receiving rate equals number of packets or bits divided by elapsed time. Elapse time is number of seconds elapsed in the packet generator while sending packets.

If the number of received packets is less than the number of received packets at any iteration, then a problem may be present in the network. For example, if the problem occurs at generally low send rates, the routers may be misconfigured. If the problem occurs at higher send rates, the upper performance limit of the network may have been found.

Exemplary Test Structures

In determining the performance of a Unit Under Test (UUT) according to this disclosure, adequate generating bandwidth must be provided, e.g., for an OC-3 system, the UUT needs two Fast Ethernets. For an OC-12 system, the UUT may need eight Fast Ethernets or at least 2 Gigabit Ethernets (GE) for generating traffic.

Likewise, adequate downstream bandwidth should be provided, e.g., for an OC-12 system, the UUT should have similar bandwidth OC-12 capacity. Thus, four OC-3 pathways for the client and sinks routers will be sufficient.

FIG. 6 is a block diagram of a test system 700 configured in accordance with this disclosure. The system 700 illustrates one possible solution for testing a OC-3-level (155.52 Mbps) system.

The system 700 may include a server 702 for generating test packets. In one preferred embodiment, the server 702 comprised Cisco 7505 router configured to host Pagent packet generation software. The server 702 may be coupled to a buffer 704 through a Fast Ethernet (FE) link. The buffer 704 may comprise a router such as a Cisco 7200 series router.

The buffer 704 may be coupled over an OC-3 ATM link to Node Switch Processor (NSP) 706 for ATM switching. The NRP 706 may further include a Node Routing Processor (NRP) 708 for implementing routing functions.

The NSP 706 may be coupled over an OC-3 ATM link to a client simulator 710. The client simulator may in turn may be coupled to a destination router 712. Both the client simulator 710 and the destination router 712 may comprise conventional routers, such as Series 7200 or 7000 routers from Cisco Systems, Inc.

In the system 700, the client simulator 710 is configured to count and tabulate the packets received from the server 702, and the destination router 712 is configured to function as a destination end-point for the sent test packets. The system 700 may further include a RADIUS server 714 for providing secure user access.

Figure 8:
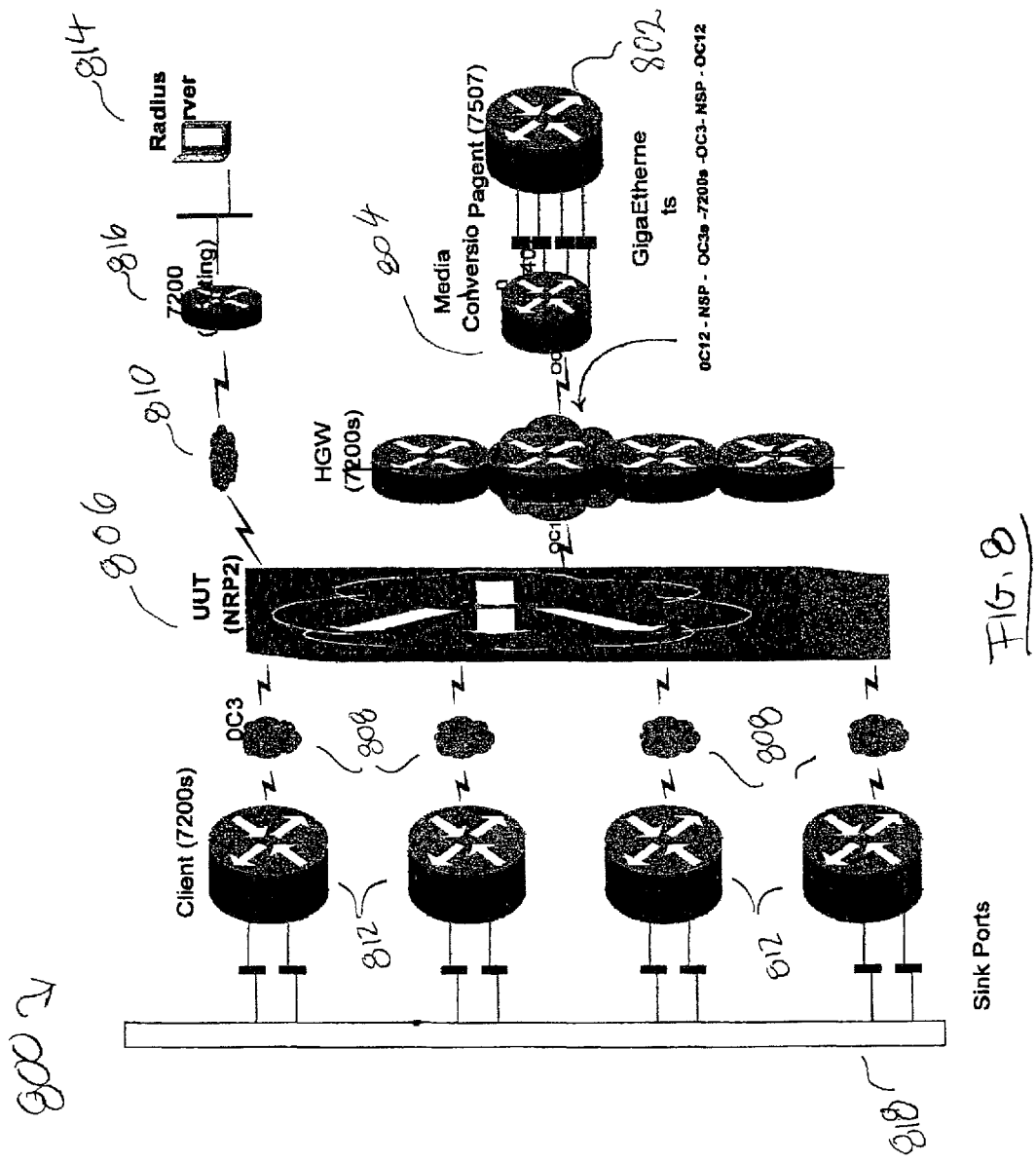
FIG. 8 is an example of a system for measuring the performance of a high-speed scalable network.

FIG. 8 is a block diagram of a high-speed test system 800 for testing a OC-12-level (622.08 Mbps) system.

The system 800 may include a server 802 for generating test packets. The server 802 may comprise a Cisco 7500 Series router configured to host Pagent packet generation software. The server 802 may be coupled to a router 804 for providing GE connectivity to a OC-12 system. The router 804 may comprise a conventional router as is known in the art, such as a Cisco Series 7200 router.

The router 804 may be coupled to a Home GateWay (HGW) 806 for transporting the test packets. To provide adequate bandwidth as described above, the HGW 808 of FIG. 8 includes four Cisco Series 7200 routers cooperatively coupled to provide OC-12 bandwidth.

To provide adequate receive capability, the UUT 808 may be coupled to a plurality of client routers 812 through an OC-3 pathway 810. The client routers may comprise conventional routers, such as Cisco Series 7200 routers, and are preferably configured to count and tabulate received test packets in accordance with the teachings of this disclosure. The client routers 812 may be coupled to at least one sink ports 818 for providing an end-point destination for the test packets.

The system 800 may further include a RADIUS server 814 coupled to the UUT 808 through a conventional router 816 by way of a OC-3 pathway 810. The server 814 may provide secure user access to the test system.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method, comprising:
preparing a network under test for testing;
establishing a static Internet Protocol (IP) routing path for a session to be tested;
sending, by a packet generator at a first end of the static IP routing path, a constant stream of packets through the network under test;
counting a number of packets received by a packet count unit at a second end of the static IP routing path, where the counting is performed without examining the contents of a received packet; and
establishing a peak performance rate as the highest rate at which packets can be sent from the packet generator to the packet count unit with no packet dropout.

2. The method of claim 1, where sending a constant stream of packets includes sending a constant stream of packets over an OC-3 level network.

3. The method of claim 1, where sending a constant stream of packets includes sending the constant stream of packets over an OC-12 level network.

4. A non-transitory computer readable medium storing a program, which, when executed on a processor performs a method for measuring the performance of a scalable network, said method comprising:
establishing a static Internet Protocol routing path between a packet sender and a packet receiver for a session to be tested;
sending, by the packet sender, a constant stream of packets to the packet receiver;
counting, at the packet receiver, the number of packets received at the packet receiver, where the counting is performed without examining the contents of a received packet; and
establishing a peak performance rate as the highest rate at which packets are received at the packet receiver with no packet dropout.

5. An apparatus for measuring the performance of a scalable network comprising:
means for preparing the network for testing;
means for establishing a routing path for a session to be tested wherein said routing path is a static IP route having a server at a first end of said route and a client node at a second end of said route;
means in a server for sending a constant stream of packets to a client node;
means in said client node for counting said packets received by said client node; and
means for establishing a peak performance rate as the highest rate with no packet dropout.

6. A system for measuring the performance of a scalable network comprising:
a packet generator in a source node at a first end of a static IP route for providing test packets to a network under test;
a packet count unit in a client node at a second end of said static IP route for counting test packets received by said client node from said network under test; and
wherein said test packets are provided in a constant stream to said network under test and wherein a peak performance rate of said network under test is established as the maximum receive rate at a particular packet size with no packet dropout.

7. The system of claim 6, wherein said network under test includes two Fast Ethernet pathways.

8. The system of claim 6, wherein said network under test includes eight Fast Ethernet pathways.

9. The system of claim 6, wherein said network under test includes at least two Gigabit Ethernet pathways.

10. The system of claim 6, wherein said network under test includes four OC-3 pathways.

11. The system of claim 6, wherein said packet generator is configured using Pagent software.

12. The system of claim 6, wherein said system is configured to download a test configuration file from a TFTP server.

* * * * *